(No Model.) 2 Sheets—Sheet 1.

J. O. HOLTZMAN.
FEED CUTTER

No. 390,601. Patented Oct. 2, 1888.

Witnesses  
Inventor  
James O. Holtzman  
By his Attorneys

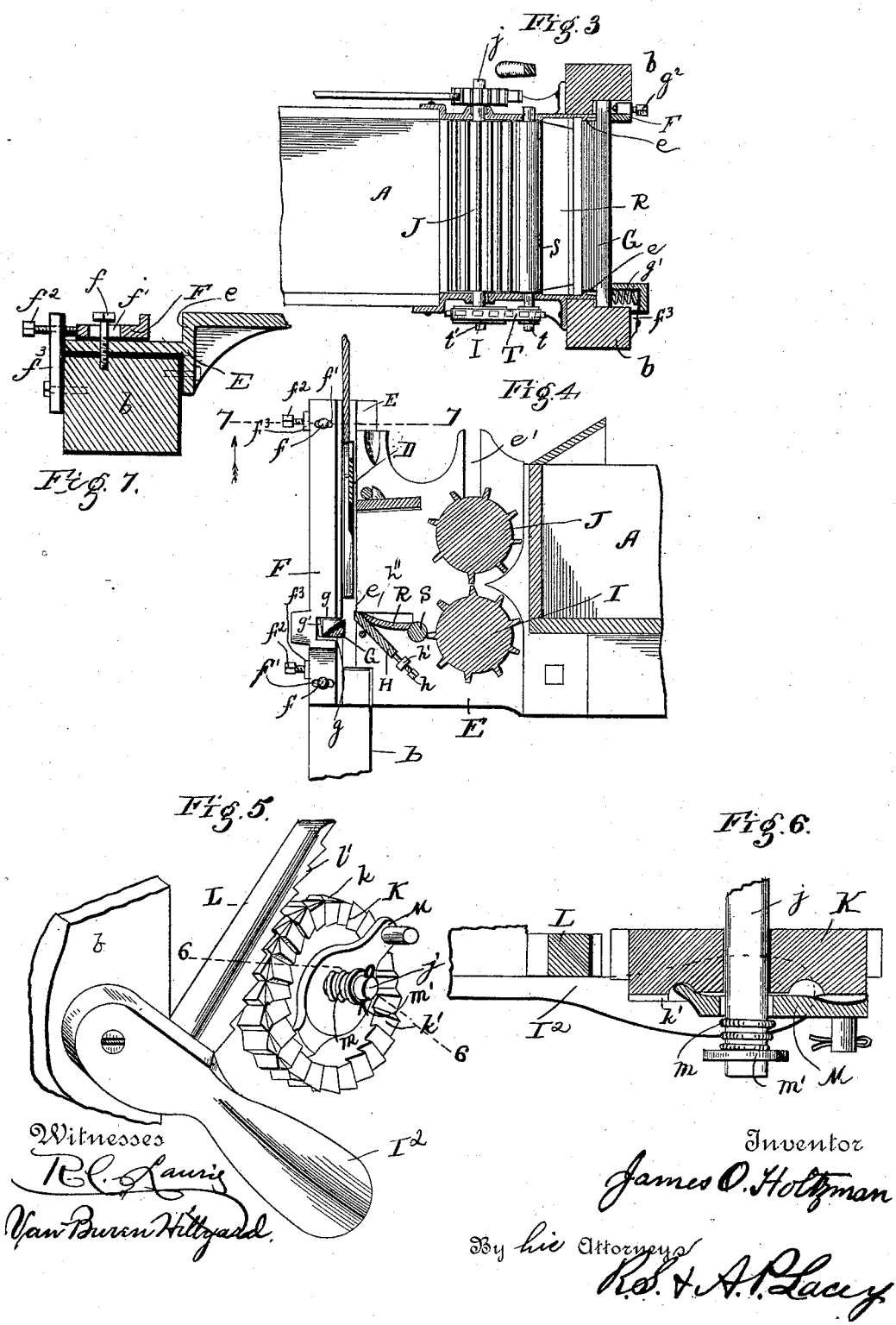

UNITED STATES PATENT OFFICE.

JAMES O. HOLTZMAN, OF BEAVER CREEK, MARYLAND.

FEED-CUTTER.

SPECIFICATION forming part of Letters Patent No. 390,601, dated October 2, 1888.

Application filed June 4, 1887. Serial No. 240,219. (No model.)

*To all whom it may concern:*

Be it known that I, JAMES O. HOLTZMAN, a citizen of the United States, residing at Beaver Creek, in the county of Washington and State of Maryland, have invented certain new and useful Improvements in Feed-Cutters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to feed-cutters of that class which have a vertically-reciprocating knife and automatic intermittent feed.

The improvement consists in the novel features presently to be described and claimed, and shown in the annexed drawings, in which—

Figure 1:
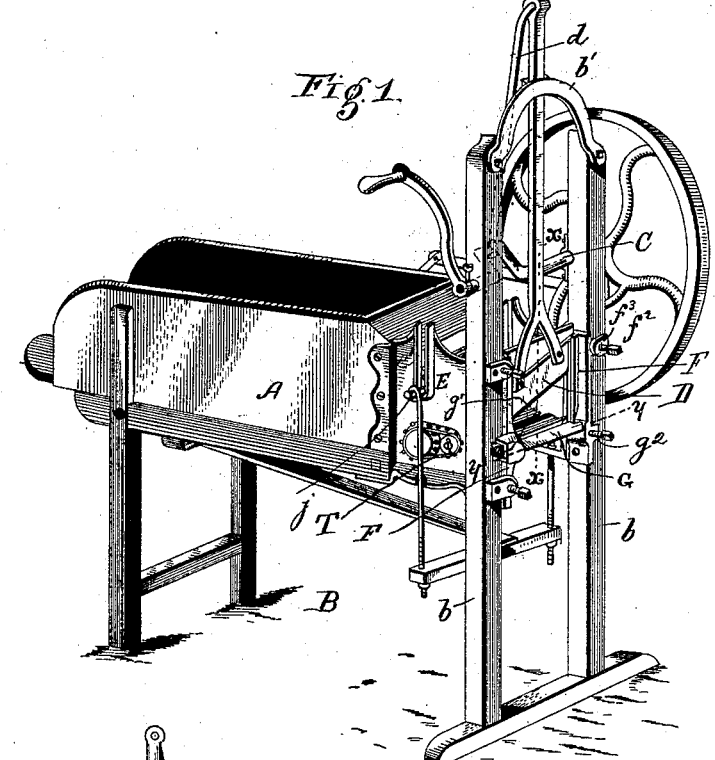
Figure 2:
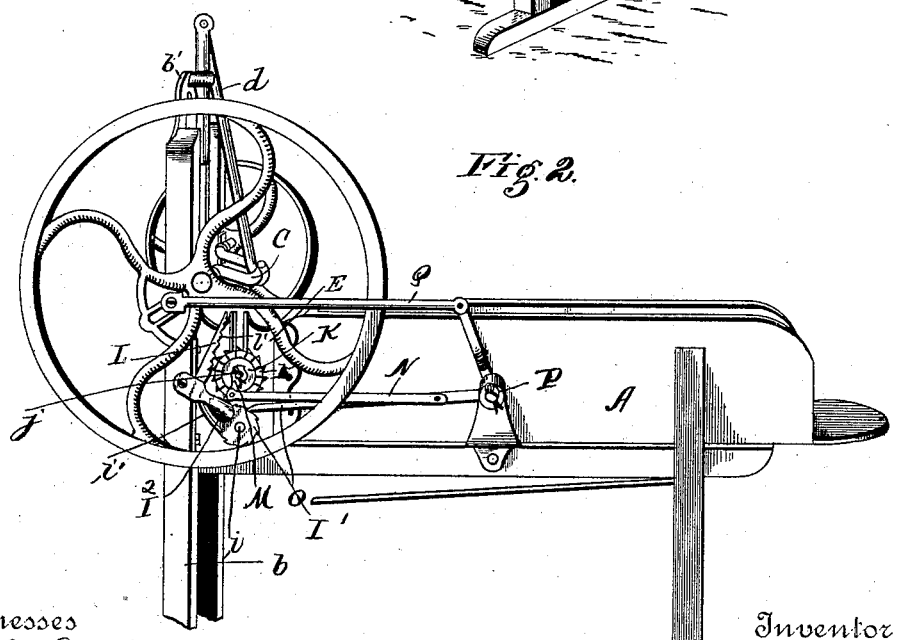

Figure 1 and 2 are perspective views of a machine of my construction embodying my invention. Fig. 3 is a cross section on the line Y Y of Fig. 1; Fig. 4, a vertical sectional view on the line X X of Fig. 1; Fig. 5, a detail perspective view of the ratchet-and-pawl mechanism for driving the feed-roller, on an enlarged scale; and Fig. 6, a detail cross-section of the devices shown in Fig. 5 on the line 6 6 of said figure, on an enlarged scale. Fig. 7 is a detail sectional view with the knife removed on the line 7 7 of Fig. 4, on an enlarged scale, looking in the direction of the arrow.

The trough A and the frame or stand B may be of any approved pattern. The front legs, $b$, of the frame are extended upward above the trough and are united at the upper ends by the yoke $b'$, and support the driving-shaft C, which is journaled transversely of the legs. The knife D is of the usual form, and its edge inclines to a horizontal plane for giving a shear or draw cut, and is mounted to slide vertically on the casting or head E, secured to the trough and legs $b$, and is operated from the shaft C by the pitman $d$. The ways for the knife are formed between the shoulder $e$ of the casting and the plate F at each end of the head or casting. The plate F is adjustable to and from the shoulder $e$ to accommodate knives of different thicknesses or to take up wear and prevent any lost motion of the knife, and is held to place by the bolts $f$, passing through transverse slots $f'$ in its face, and is adjusted by the set-screws $f^2$, passing through the lugs $f^3$ and bearing on the front edge of the plate. The guard-bar G, having its upper side inclined downwardly and outwardly, has its ends fitted in notches $g$ in the inner sides of the adjustable plates F. One end of the guard-bar is held or forced toward the shear-bar in a yielding manner by the spring $g'$, interposed between the bottom of the notch and the outer side of the guard-bar, while the other end of the guard-bar is forced toward the shear-bar and fixedly held in an adjusted position by the set-screw $g^2$, passing through a lug of the plate F, adjacent thereto.

The bar G is arranged nearly opposite the shear-bar H, and the yielding end thereof is adjacent to the lower end of the knife D, which works between the said bar G and shear-bar H, the bar G being adjusted to hold the knife close against the shear-bar during the process of cutting. One end of the bar G is made yielding to prevent the knife from binding when passing between it and the shear-bar, and the other end remains stationary, when once adjusted, to prevent the knife from being forced away from the shear-bar at the finish of the draw-cut. Owing to the loose character of straw and the inclined edge of the knife, the greater part of the straw will be crowded toward the higher end of the knife, which will perform the greater part of the cutting; hence the necessity of holding the said knife firmly against the shear-bar at the finish of the cut.

The shear-bar inclines to the plane of motion of the knife, and its upper edge is beveled equally in each direction from a line intermediate its two sides, so that when the edge corresponding with one of the bevels is dulling the edge corresponding with the other bevel is correspondingly sharpening, whereby, when one edge is dull, a sharp edge may be had by reversing the shear-bar or turning it end for end. The shear-bar rests with its rear edge upon the set-screws $h$, extending through the lugs $h'$, and is adjusted by said set-screws to take up wear. The front end of the shear-bar is supported in any convenient manner, as by the cross-bar $h''$. (Shown most clearly in Fig. 4.)

The feed-rollers I and J, corrugated or ribbed, are journaled in the head or casting E.

The lower feed-roller is fixedly journaled; but the upper roller is mounted in slots $e'$, which allow it to rise and accommodate itself to the bulk of grain passing between the feed-rollers. The journals of the feed-rollers are extended on one side beyond the casting, and the journal $i$ of the feed-roller I has the ratchet-wheel I' keyed thereto, and is held from retrograde movement by the detent $i'$. The journal $j$ of the feed-roller J is provided with the crown ratchet-wheel K, which is held from turning back by the gravity-pawl L, extending upwardly from the weighted lever l', which is pivoted to one of the legs $b$, and provided at its upper end with a series of teeth, $l'$, which are adapted to engage with the teeth $k$ on the periphery of the ratchet-wheel K. The wheel K, in addition to the teeth $k$ on its periphery, has crown-teeth $k'$ on its outer side, which are engaged by the lever-pawl M, loosely mounted on the journal $j$, so as to turn freely, and has a limited longitudinal movement thereon. One end of the lever-pawl bears upon the side of the ratchet-wheel K, and travels in a groove or channel therein, and the other end is provided with a lug, which is adapted to engage with the crown-teeth $k'$ and turn the ratchet-wheel at each forward movement of the lever-pawl M, which is provided with a wrist-pin by which it is connected through rod N with the pawl O.

The outer or free end of the pawl O engages with the ratchet-wheel I', and its inner end is connected with the rock-shaft P, operated from the driving shaft by pitman Q. The spring $m$, mounted upon the journal $j$ and located between the lever-pawl M and the washer $m'$, holds the lever-pawl in engagement with the ratchet-wheel K. The space between the shear-bar and feed-roller I is filled by the guide-plate R and the guide-roller S, which latter assists the forward motion of the grain to the knife, and is run from roller I by sprocket-chain T, passing over sprocket-wheels $t$ and $t'$ on the journals of the rollers S and I, respectively.

The moving parts are operated from the crank-shaft C, and during the downstroke of the knife the rock-shaft P is moving back previous to operating the feed-rollers through their respective pawls O and M. During the upstroke of the knife the pawls move forward and rotate the feed-rollers, so as to advance the grain under the knife. If the knife should become loose in its ways, the plates F are adjusted till it moves steady and has no lost motion. The shear-bar is reversed when dull upon one side, and is adjustable to allow for wear.

Having thus described my invention, what I claim, and desire to secure by Letters Patent, is—

1. In a feed-cutter, the combination, with the casting or head E, having the trough A, and the legs $b\ b$, secured thereto and having the shoulders $e$ and the vertically-reciprocating knife, of the plates F, having transverse slots, the bolts $f$, passing through the said slots for adjustably connecting the said plates with the casting or head, the lugs $f^3$, and the set-screws $f^2$, for adjusting the plates with reference to the said shoulders, substantially as and for the purpose described.

2. In a feed-cutter, the combination, with the frame, the reciprocating knife, and the shear-bar, of the guard-bar, the spring acting on one end of the guard-bar to yieldingly hold it against the knife, and the set-screw for positively adjusting the other end of the guard-bar, substantially as described, for the purpose specified.

3. The combination of the casting having shoulders, the slotted plates forming ways between their inner edges and the shoulders and having notches in their inner edges, the set-screws for adjusting the plates in relation to the shoulders, the guard-bar having its ends fitted in said notches and carried by the plates, the set-screw for adjusting the guard-bar independently of the plates, and the knife working in said ways, substantially as specified.

4. The combination, with the frame, the upper feed-roller journaled in the frame and having its journal extended, and the ratchet-wheel having crown or side teeth, of the lever-pawl mounted upon the journal and free to turn thereon, one end of the lever-pawl being extended to form a short lever which is adapted to bear against the side of the ratchet-wheel and the other end of the lever-pawl engaging with the crown-teeth, and the spring for yieldingly holding the pawl in engagement with the ratchet-wheel.

5. The combination, with the frame, the knife, and the reversible shear-bar inclined from its cutting-edge and having its cutting end beveled in opposite directions to form the cutting-edge, of the lugs extended from the frame and the set-screws passing through the lugs and obtaining a purchase on the said shear-bar for adjusting it, substantially as described.

In testimony whereof I affix my signature in presence of two witnesses.

JAMES O. HOLTZMAN.

Witnesses:
JAMES D. DUFFEY,
J. IRVIN BITNER.